United States Patent [19]

Matlack

[11] 4,250,287
[45] Feb. 10, 1981

[54] 1-OLEFIN POLYMERIZATION CATALYST

[75] Inventor: Albert S. Matlack, Hockessin, Del.

[73] Assignee: Hercules Incorporated, Wilmington, Del.

[21] Appl. No.: 130,500

[22] Filed: Mar. 14, 1980

Related U.S. Application Data

[63] Continuation-in-part of Ser. No. 110,563, Jan. 9, 1980.

[51] Int. Cl.$^3$ ............................ C08F 4/02; C08F 10/00
[52] U.S. Cl. ................................. 526/125; 252/429 B; 526/127; 526/128; 526/351
[58] Field of Search ........................ 526/125, 127, 128

[56] References Cited

U.S. PATENT DOCUMENTS

| | | | |
|---|---|---|---|
| 4,071,672 | 1/1978 | Kashiwa | 526/125 |
| 4,085,276 | 4/1978 | Toyota et al. | 526/125 |
| 4,159,256 | 6/1978 | Sakurai et al. | 526/125 |

*Primary Examiner*—Edward J. Smith
*Attorney, Agent, or Firm*—John W. Whitson

[57] ABSTRACT

In the polymerization of 1-olefins using a solid catalyst component composed of a titanium halide deposited on an anhydrous, essentially magnesium halide support and an activator component composed of a trialkylaluminum and an alkyl ester of an aromatic carboxylic acid, the productivity of the catalyst is increased by including a halosilane in the activator component.

4 Claims, No Drawings

1-OLEFIN POLYMERIZATION CATALYST

This application is a continuation-in-part of applicant's copending application Ser. No. 110,563, filed Jan. 9, 1980.

This invention relates to the polymerization of 1-olefins using an improved catalyst. More particularly, it relates to an improved trialkylaluminum activator composition and the process of using it. This composition provides for increased productivity of the catalyst when used as a catalyst component in the polymerization of 1-olefins.

As is well known in the art, effective catalysts for the polymerization of 1-olefins are the Ziegler-Natta catalysts obtained by combining transition metal compounds of Groups IVb to VIb of the periodic table with organometallic compounds of Groups I to III of the table. It also is known that these catalysts can be made more effective by depositing the transition metal component on an inorganic compound as a support. Essentially anhydrous magnesium halides, $MgX_2$, wherein X is a chlorine or bromine atom, are preferred support materials. Nevertheless, many of the resulting catalysts have not been completely satisfactory due to the fact that the amount of polymer produced per unit of the transition metal component used is not enough to obviate removal of the catalyst residues from the polymer product.

Now, in accordance with this invention, it has been found that, in a process of polymerizing 1-olefins using a solid catalyst component composed of a titanium halide deposited on an anhydrous, essentially magnesium halide support and an activator component composed of a trialkylaluminum and an alkyl ester of an aromatic carboxylic acid, the productivity of the catalyst can be considerably improved by including any one or more of a selected group of halosilanes in the activator component. For example, the inclusion, on a molar basis, of as little as 0.3, based on the trialkylaluminum, of one of the specified halosilanes in the activator composition may increase the mileage by as much as 50%.

Having generally described the embodiments of this invention, the following examples constitute specific illustrations thereof. All amounts are as given in the examples.

EXAMPLE 1

Support Preparation

Under an atmosphere of argon throughout the reaction, a flask was charged with 30 mmols of diisoamyl ether (DIAE) and 60 mmols of dibutylmagnesium, and hexane was added to a total volume of approximately 120 ml. The flask was cooled to −65° C. and 180 mmols of ethylaluminum dichloride was added dropwise over two hours with stirring at a speed of 250 r.p.m. The final volume was approximately 225 ml. The mixture was stirred an additional hour at −65° C., then allowed to warm to room temperature over one-half hour and stirred for another hour. The supernatant liquor was decanted, and the support was washed five times with 100-ml. portions of fresh hexane. The solid was resuspended in hexane to a total volume of about 150 ml. [Anal.: 0.36 M Mg; 0.085 M Al; 1.15 M Cl.]

CATALYST PREPARATION

Under an atmosphere of argon, the above slurry of magnesium chloride particles in hexane was treated with 47.4 mmols of DIAE (ratio of ether/Mg about 0.9) for one hour at room temperature. The liquor was decanted, and the solid was washed three times with 100-ml. portions of hexane; the solid was then resuspended in 150 ml. of fresh hexane. To this slurry, 1.44 mmols of ethyl benzoate was added, and the mixture was stirred at room temperature for one hour, following which 2.88 mmols $TiCl_4$ was added and the resulting mixture was stirred at 35° C. for another hour. An additional 47.4 mmols of DIAE was then added and the mixture was stirred another hour at 35° C. After decantation of liquid, the solid was washed three times with 100-ml. portions of hexane and resuspended to a volume of 360 ml. [Anal.: 0.0038 M Ti; 0.139 M Mg; 0.272 M Cl; 0.001 M Al; thus providing for 2.66 mol % Ti (based on Mg) and a Cl/Mg ratio of 1.95].

POLYMERIZATION OF PROPYLENE

Polymerizations were conducted in magnetically stirred vessels of 800 milliliters volume. The vessels were charged with 400 ml. of purified hexane, which was free of air and water, under argon. The values given in the first three columns of Table I are the millimoles of reagents added to the vessel at room temperature. The argon was replaced by propylene, and the solid catalyst was injected by syringe as a slurry in hexane. [The amount of Ti listed in the fourth column of Table I is calculated from the analysis of the polypropylene product for p.p.m. Ti]. After approximately five minutes, the temperature of the vessel was raised to 65° C., and the total pressure was increased to 38 p.s.i.g. (hexane vapor as well as propylene). Propylene was continuously added to the reaction mixture for three hours to maintain the pressure at 38 p.s.i.g., after which the addition of propylene was discontinued and the system was reacted down for 15 minutes. The polypropylene product was filtered while hot, washed once with 150 ml. of fresh hexane which was at room temperature, and dried.

The remaining information pertaining to the above polymerizations also is shown in Table I. In this table, the following definitions apply: EtOAn=ethyl-p-anisate; DHN=decahydronaphthalene; Mileage=the number of grams of the polypropylene product insoluble in the hexane solvent per millimole of titanium; and "Z"=the average rate, expressed in grams of diluent insoluble polypropylene product, at which the product is produced per millimole of titanium per atmosphere of propylene per hour. The values given for the amount of decahydronaphthalene-soluble polymer were determined by recrystallization of the hexane-insoluble polymer from decahydronaphthalene.

TABLE I

| | $Et_3Al$ | $SiHCl_3$ | EtOAn | Ti (mmols) | Total Hrs. | % Polymer insol. in hexane | % Hexane-insol. polymer sol. in DHN | Mileage | "Z" | Bulk density g./cc |
|---|---|---|---|---|---|---|---|---|---|---|
| (a) | 0.35 | 0 | 0.10 | .0092 | 3.0 | 92.1 | 9.1 | 5320 | 675 | 0.33 |
| (b) | 0.35 | 0.10 | 0.10 | .0077 | 3.0 | 92.7 | 10.4 | 8000 | 1018 | 0.32 |
| (c) | 0.35 | 0.20 | 0.10 | .0097 | 3.0 | 92.5 | 10.0 | 8000 | 1018 | 0.33 |

TABLE I-continued

| | Et$_3$Al | SiHCl$_3$ | EtOAn | Ti (mmols) | Total Hrs. | % Polymer insol. in hexane | % Hexane - insol. polymer sol. in DHN | Mileage | "Z" | Bulk density g./cc |
| --- | --- | --- | --- | --- | --- | --- | --- | --- | --- | --- |
| (d) | 0.35 | 0.32 | 0.10 | .0106 | 3.0 | 93.1 | 9.9 | 8000 | 1018 | 0.33 |
| (e) | 0.35 | 0.64 | 0.10 | .0081 | 3.0 | 92.3 | 9.7 | 9600 | 1214 | 0.33 |

EXAMPLE 2

The procedure of Example 1 was followed except to carry out the polymerization at 60° C. and to substitute 0.64 mmol of methyldichlorosilane (CH$_3$SiHCl$_2$) for the 0.64 mmol of trichlorosilane of (e) of Example 1. The amount of polymer product insoluble in hexane was 91.0%, the amount of decahydronaphthalene solubles was 13.8%, the mileage was 9800, The rate was 1240 and the bulk density was 0.32 g./cc. The corresponding values for the control (no silane) were 89.4%, 14.0%, 5300, 676 and 0.31 g./cc.

EXAMPLE 3

Following the procedure of Example 2, 0.64 mmol of dichlorosilane was used in conjunction with 0.32 mmol of triethylaluminum and 0.10 mmol of ethyl-p-anisate as the activator composition, and the polymerization was run for three and three-tenths hours instead of three. The hexane-insoluble polymer amounted to 95.0% and the decahydronaphthalene solubles amounted to 9.5%. The mileage was 10200, the rate 1175 and the bulk density 0.35 g./cc. The actual rate of polymerization at the time the polymerization was interrupted was 50% of the initial rate. The corresponding polymerization run as a control provided 92.2% hexane-insoluble polymer, 8.2% decahydronaphthalene solubles, a mileage of 5560, a rate of 641, a bulk density of 0.35 g/cc. and an actual rate, when the polymerization was interrupted, of 20% of the initial rate of polymerization.

EXAMPLE 4

SUPPORT PREPARATION

A 1000 ml., four-necked reaction vessel was equipped with a mechanical stirrer, two pressure-equalized dropping funnels, a thermometer, an argon inlet, an argon outlet and a bubbler. All components of the apparatus were dried and purged with argon. An argon atmosphere was provided throughout the reaction. The flask was charged with 100 ml. of hexane. One dropping funnel was charged with 113 ml. of a 0.266 molar solution of magnesium 2-ethylhexanoate (30 millimoles) in an approximately 50:50 by volume admixture of hexane and an 85 aliphatic:15 cycloaliphatic hydrocarbon mixture having a boiling point range of about 175° to 190° C. To the solution of magnesium 2-ethylhexanoate in the dropping funnel was added 0.28 g. of poly(2-ethylhexyl acrylate) dissolved in one milliliter of toluene, and the solutions were mixed with a spatula under argon. The other dropping funnel was charged with 23 ml. of a 3.1 molar solution of ethylaluminum dichloride (71 millimoles) in heptane, followed by 90 ml. of hexane. The contents of the two dropping funnels were added at equal rates to the hexane in the flask over a period of three hours while stirring the reaction mixture at 260 r.p.m. The aluminum to magnesium mole ratio in the reaction mixture was 2.4:1.

After stirring the reaction mixture for an additional 2.2 hours, the resulting finely-divided white slurry of magnesium chloride was divided into two portions, one portion of which, containing 16 millimoles of magnesium, was washed free of unadsorbed aluminum compounds by centrifuging, decanting and resuspending the slurry five times using 75-ml. portions of toluene. After the final wash, the solid particles were resuspended in hexane to provide a slurry having a total volume of 100 ml. To this hexane slurry of magnesium chloride (16 millimoles of magnesium) was added 1.4 milliliters of di-n-butyl ether (8.5 millimoles) and the resulting admixture was tumbled for one hour at room temperature. The white slurry then was centrifuged, the solvent decanted and the resulting solid washed four times using 50 ml. of hexane each time.

CATALYST PREPARATION

After resuspending the ether-treated particles from the above preparation in hexane, the resulting slurry (16 millimoles of magnesium) was agitated with 3.8 ml. of a 0.1 molar solution of ethyl benzoate (0.38 millimole) in hexane for one hour at room temperature. To the slurry then was added 2.5 ml. of a 0.3 molar solution of titanium tetrachlordie (0.75 millimole) in hexane and the reaction mixture was agitated for one hour at 35° C. The resulting slurry was treated with 0.71 ml. of di-n-butyl ether (4.2 millimoles) for one hour at 35° C. and then was centrifuged, the solvent decanted and the solid washed four times using 75 ml. of hexane each time. The slurry was resuspended to 50 ml. with hexane.

POLYMERIZATION OF PROPYLENE

An 800 ml. glass polymerization vessel was charged with 400 ml. of hexane and, after sparging the vessel with argon, the hexane was sparged with propylene at room temperature and atmospheric pressure. The total pressure was then adjusted to 5 p.s.i.g. with propylene while 0.35 millimole of triethylaluminum, 0.1 millimole of ethyl-p-anisate and 0.64 millimole of trichlorosilane were added to the polymerization vessel, followed by 3.5 ml. of the catalyst (0.0062 millimole of titanium) prepared as above. After a prepolymerization period of 15 minutes, the temperature was raised to 60° C. and the total pressure was adjusted to 37 p.s.i.g. with propylene, after which the temperature was raised to 65° C. over a period of 10 minutes. Propylene was continuously added to the reaction mixture for three hours to maintain the pressure at 37 p.s.i.g. (2.63 atmospheres partial pressure of propylene), after which the addition of propylene was discontinued and the system was reacted down for 15 minutes.

The white powdery polypropylene product was filtered while hot, washed once with 150 ml. of fresh hexane which was at room temperature, and dried. It was determined that the polypropylene product was obtained at an average rate of 1010 g. of diluent insoluble polypropylene per millimole of titanium per atmosphere of propylene per hour. The mileage was 8000 g. of diluent insoluble polypropylene per millimole of titanium. The polymer product contained 92.9% of diluent insoluble polymer and the latter contained 7.5% of decahydronaphthalene solubles as determined by recrystallization of the diluent insoluble polymer from decahydronaphthalene. The polymer product had a bulk density of 0.31 g./cc. The particle size distribution of the product was:

| Mesh Size: | On 20 | 40 | 60 | 80 | 100 | 200 | Through 200 |
|---|---|---|---|---|---|---|---|
| Weight % | 5.3 | 59.8 | 30.3 | 2.5 | 1.2 | 0.7 | 0.2 |

The improved activator component of the Ziegler-Natta catalyst system used in the polymerization of 1-olefins in accordance with this invention is composed of a trialkylaluminum, an alkyl ester of an aromatic carboxylic acid and a halosilane having the formula $ASiHX_2$. Each of these is a necessary ingredient, and the amounts thereof are very important in obtaining the desired polypropylene products and the desired improvement in productivity.

In general, the trialkylaluminums used in accordance with this invention are those trialkylaluminums in which each alkyl group contains from one to ten carbon atoms. Representative compounds are trimethylaluminum, triethylaluminum, tri-n-propylaluminum, triisopropylaluminum, tri-n-butylaluminum, triisobutylaluminum, tri-n-hexylaluminum, triisohexylaluminum, tri-n-decylaluminum and mixtures thereof.

The alkyl esters of aromatic carboxylic acids used in the activator component of this invention are those alkyl esters, preferably the lower alkyl ($C_1$-$C_4$) esters, of aromatic carboxylic acids wherein the esters contain a total of eight to twenty-six carbon atoms, preferably eight to sixteen carbon atoms. Exemplary esters are methyl benzoate, ethyl benzoate, isobutyl benzoate, ethyl p-anisate, ethyl o-anisate, ethyl p-toluate, methyl p-toluate, methyl m-chlorobenzoate, methyl o-fluorobenzoate, ethyl p-decylbenzoate, ethyl p-nonyloxybenzoate, ethyl p-hexadecyloxybenzoate and mixtures thereof. The p-anisate and p-toluate esters are somewhat preferred to the benzoate esters in that the former generally provide a smaller amount of diluent soluble polymer in the polymer product.

The halosilanes used in the activator component in accordance with this invention have, as mentioned above, the general formula $ASiHX_2$. In this formula, A may be a hydrogen atom, a lower alkyl ($C_1$-$C_4$) group or X, and X may be a chlorine or bromine atom. Thus, the halosilanes of this invention may be dichlorosilane, trichlorosilane, methyldichlorosilane, ethyldichlorosilane, propyldichlorosilane, butyldichlorosilane, the corresponding bromosilanes, those compounds of the above formula containing both chlorine and bromine atoms, such as bromochlorosilane and bromodichlorosilane, and mixtures thereof. The operability of these particular halosilanes was not predictable. Halosilanes wherein A was other than lower alkyl, for example, phenyl, showed essentially no activity. The same was true for those compounds containing only one halogen, such as in chlorodimethylsilane, or no halogen at all, as in triethylsilane and triphenylsilane. Also inactive were those halosilanes containing no hydrogen, as in ethyltrichlorosilane and tetrachlorosilane. The halosilanes of this invention may be combined with the other activator components either before or after the catalyst component is added to the polymerization system.

The mole ratio of trialkylaluminum ($R_3Al$) to the ester in the activator component used in accordance with this invention is very important. More specifically, the mole ratio of aluminum to ester should be at least 3:1 and no more than 4:1, and preferably is from about 3.2:1 to about 3.5:1. When this ratio is as low as 2.5:1, for example, the yield of polymer is low and, when the ratio reaches 4:1, the proportion of the polymer product that is diluent soluble may be as much as 30% of the total polymer produced. With regard to the halosilane, the mole ratio of silicon to aluminum preferably should be at least about 0.3:1, since smaller amounts of the halosilane relative to the trialkylaluminum may not provide a substantial increase in mileage. The mole ratio of silicon to aluminum may be as high as about 10:1, but ordinarily will be no more than about 2:1. The maximum improvement in mileage usually is obtained at ratios from about 1.4:1 to about 1.8:1. It is significant that, concurrent with the increase in mileage brought about by use of the halosilanes in accordance with this invention, there is essentially no decrease in the percentage of diluent-insoluble polymer in the product. As a matter of fact, small increases in the percentage of diluentinsoluble polymer are often observed. This is contrary to many other Ziegler-Natta catalyst systems, which, although effecting an increase in mileage, also lead to a decrease in the percentage of diluent-insoluble polymer in the product.

Relative to the solid catalyst component which is used in accordance with this invention, it is composed of a titanium halide deposited on anhydrous, essentially magnesium halide support particles, and the preparation of representative catalyst components has been shown in the examples. However, other methods of preparing the magnesium halide support particles may be used and are known in the art. Also known in the art are procedures for depositing the titanium halide on solid supports.

The titanium halides preferably used in accordance with this invention are, for example, titanium tetrachloride, methoxytitanium trichloride, titanium tetrabromide and titanium tetraiodide. More generally, the titanium halides may be characterized by the formula $TiX_{n}$-$(OR)_{4-n}$, wherein R is a $C_1$-$C_{20}$ alkyl group, X is a chlorine, bromine or iodine atom and n is 1, 2, 3 or 4. Titanium tetrachloride is preferred. The amount of the tetravalent titanium halide added to the support is preferably such that the magnesium to titanium mole ratio is in the range of from about 200:1 to about 1:1, more preferably from about 80:1 to about 5:1.

In conjunction with depositing the titanium halide on the magnesium halide support, it may be desirable to treat the support particles with an electron donor, more specifically, an alkyl ester of an aromatic carboxylic acid wherein the ester contains a total of eight to twenty-six carbon atoms, as previously described. This particular group of electron donor compounds exhibits the effect of increasing the stereospecificity of the titanium halide in the production of polypropylene. However, excessive amounts of these esters have an adverse effect on the activity of the titanium catalyst, and the amount of the ester must be controlled in order that the titanium to ester mole ratio lies in the range of from about 0.5:1 to about 10:1, preferably from about 2:1 to about 4:1. Both the ester treatment of the support particles and the deposition of the titanium halide on the support may be carried out at a temperature of from about 0° to about 100° C., preferably from about 15° to about 60° C., for a period of from about 0.25 hour to about two hours. Following deposition of the titanium halide on the support, the support particles are washed with hydrocarbon.

After treatment with the titanium halide, the support particles also may be further treated with an electron donor, preferably an aliphatic ether containing four to twenty-four carbon atoms, such as diethyl ether, diisopropylether, dibutyl ether, diisoamyl ether, dihexyl ether and dioctyl ether. The amount of ether used may be from about 1:10 to about 5:1, preferably from about 1:5 to about 1:1, on a molar basis relative to the amount of magnesium present. The ether treatment may be carried out at a temperature of from about 20° to about 50° C. for about 0.25 to about one hour. The supported catalyst particles are then thoroughly washed with hydrocarbon and resuspended in hydrocarbon for use in the polymerization of 1-olefins.

The hydrocarbons, used in the processing steps shown in the examples may be $C_5$-$C_{16}$ aliphatic hydrocarbons, $C_5$-$C_{16}$ cycloaliphatic hydrocarbons, $C_6$-$C_{16}$ monocylic aromatic hydrocarbons or mixtures of any of these hydrocarbons. The preferred hydrocarbons are the $C_5$-$C_{12}$ aliphatic hydrocarbons and the $C_6$-$C_{12}$ monocyclic aromatic hydrocarbons. Representative of the aliphatic hydrocarbons are pentane, hexane, heptane and octane. Representative of the cycloaliphatic hydrocarbons are cyclopentane and cyclohexane, and exemplary of the aromatic hydrocarbons are benzene, toluene and xylene.

The 1-olefins which may be polymerized in accordance with this invention are well known. Other than the propylene shown in the examples, representative olefins are ethylene, 1-butene, 4-methyl-pentene-1 and 1-hexene. Mixtures of the 1-olefins also may be utilized.

In addition to the increased mileage obtained by the polymerization of these olefins in accordance with this invention, it is to be observed, as shown in Example 3, that the activity of the catalyst does not decrease to as great an extent as it does when the activator component is composed only of a trialkylaluminum and an alkyl ester of an aromatic carboxylic acid. Accordingly, the polymerization of 1-olefins in accordance with this invention represents a distinct improvement in the art.

What I claim and desire to protect by Letters Patent is:

1. In a process for the polymerization of 1-olefins in the presence of a solid catalyst component composed of a titanium halide deposited on an anhydrous, essentially magnesium halide support and an activator component composed of a trialkylaluminum and an alkyl ester of an aromatic carboxylic acid, said ester containing from eight to twenty-six carbon atoms, the improvement which comprises including a halosilane in the activator component, said halosilane having the formula $ASiHX_2$, wherein A is a hydrogen atom, a lower alkyl group or X, and X is a chlorine or bromine atom, the amount of said halosilane being sufficient to provide a mole ratio of silicon to aluminum of from about 0.3:1 to about 10:1.

2. The process of claim 1 wherein the mole ratio of silicon to aluminum is from about 1.4:1 to about 1.8:1.

3. The process of claim 1 wherein the trialkylaluminum is triethylaluminum and the halosilane is trichlorosilane.

4. The process of claim 3 wherein the ester is ethyl benzoate, ethyl p-anisate, methyl p-toluate or ethyl p-toluate.

* * * * *